Patented Dec. 28, 1943

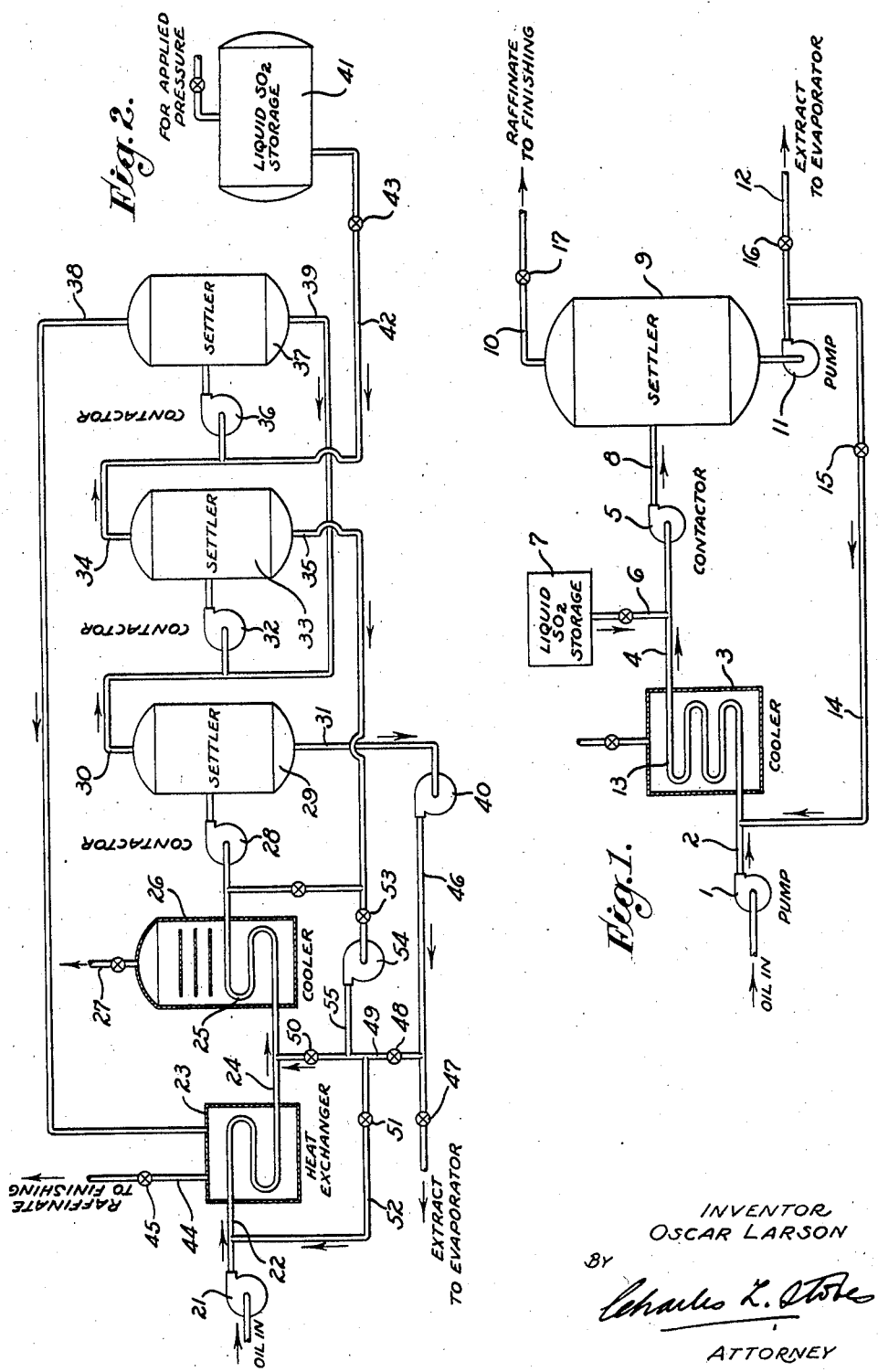

2,337,669

UNITED STATES PATENT OFFICE 2,337,669

SOLVENT REFINING

Oscar Larson, Associated, Calif., assignor to Tide Water Associated Oil Company, San Francisco, Calif., a corporation of Delaware Application February 5, 1940, Serial No. 317,334

12 Claims. (Cl. 196—37)

This invention relates to the refining of hydrocarbon oils with a selective solvent, such as liquid sulphur dioxide, at low temperatures, and more particularly to the reduction of back pressure through certain parts of the refining equipment.

In the refining of hydrocarbon oils by the well-known Edeleanu process the oil is usually cooled to a temperature between about 0° F. and about 35° F., and extracted with liquid sulphur dioxide whereby the more soluble constituents of the oil are dissolved in the liquid sulphur dioxide and form an extract phase. The least soluble constituents remain undissolved as an oil, or raffinate, phase. After separation of the two phases the $SO_2$ is removed by evaporation and there results a raffinate, or refined oil, and an extract. Generally it is the raffinate which is sought from the process. However, at times, for example in the manufacture of aromatic solvent oils, the extract is the desired phase.

The presence of moisture in the oil to be treated results in the formation of sulphurous acid with attendant corrosion difficulties. Therefore, it is customary to dry the oil before treatment by passage through salt towers, by vacuum flashing, or by other means known to the art. It has been found, however, that even after drying the oil by normal methods, sufficient water remains in the oil (either in the form of dissolved moisture or in the form of hydrates) to freeze and plug up the cooling equipment with frozen solids, causing increased back pressure on pumps and even complete stoppage of flow. Particularly is this true when the oil is cooled to temperatures approaching 0° F. prior to the sulphur dioxide treatment.

The present invention proposes a simple expedient whereby the above troubles are greatly alleviated. It is therefore an object of the invention to reduce the back pressure exerted by oil cooling equipment used in solvent refining processes.

Another object of the invention is to prevent the plugging of the oil cooling apparatus with frozen solid material.

Other objects will be apparent from the following disclosure.

Briefly described, the invention comprises adding to the oil to be treated and before cooling a quantity of the extract phase (liquid sulphur dioxide containing the soluble constituents of the hydrocarbon oil) and passing the mixture through the cooler. The extract phase will dissolve in the untreated oil until an amount in excess of 50% of the volume of the untreated oil has been added. It has been found that the presence of the liquid sulphur dioxide dissolved in the untreated oil prevents the formation of the aforementioned frozen solids in the cooling equipment. In fact such frozen solids, when formed in the cooling equipment, may be removed by injecting extract phase into the oil entering the cooler.

As the purpose here is to obtain sulphur dioxide dissolved in the oil, the amount added should be insufficient to cause a separation of phases. Any additional amount will necessarily cause additional back pressure. In most cases a volume of extract equal to about 25% of the volume of the untreated oil will give excellent results. However, depending on the characteristics of the oil, the temperature of treatment, the quantity of moisture present, and the results desired, the volume so added may be varied between about 10% and about 50% of the volume of untreated oil.

Instead of extract phase, fresh liquid sulphur dioxide may be used for the purposes of the invention but, in the case of countercurrent extraction methods which are generally used, the injection of fresh liquid sulphur dioxide into the untreated oil will disturb the phase relationships of the countercurrent flow and result in a drop in the efficiency of the countercurrent extraction.

The invention may be more readily understood by reference to the examples of the accompanying drawing in which Figure 1 illustrates a form of the invention applied to a typical single stage extraction process and Figure 2 illustrates the invention in combination with a typical multi-stage extraction process.

Referring to Figure 1, hydrocarbon oil to be treated, and previously dried, is charged by pump 1 through line 2 and cooler 3, wherein the temperature of the oil is reduced to the desired extent. As generally practiced in the art, temperatures ranging from 15° to 35° F. are utilized in the treatment of viscous lubricating stocks, whereas temperatures ranging down to 0° F., or even lower, are employed in the treatment of light oils and solvent oils. The cooled oil passes from cooler 3, through line 4 into contactor 5 wherein it is thoroughly mixed with cold liquid sulphur dioxide supplied from storage tank 7 through line 6. The volume of liquid sulphur dioxide so supplied is generally between 100% and 300% of the volume of the oil to be treated, although more or less may be used according to principles well known in the art. The liquid sulphur dioxide, when contacted with the oil, dissolves the more soluble constituents and there is formed an extract phase comprising the liquid sulphur dioxide containing in solution certain constituents of the oil, and a raffinate phase comprising undissolved oil in which there is dissolved some sulphur dioxide.

The mixture is then passed through line 8 into settler 9 in which the two phases separate, the extract phase being heavier and settling to the bottom. The raffinate phase, being lighter, rises to the top and leaves the settler through line 10, after which the dissolved sulphur dioxide is removed and the raffinate oil is subjected to any desired finishing treatment. The extract phase is withdrawn from the bottom of the settler and picked up by pump 11 and forced through line 12 into an evaporator (not shown) in which the sulphur dioxide is evaporated from the extract, recompressed, and returned to storage tank 7 for further use. Suitable pressure is maintained in the system by valves 16 and 17.

As described so far, the process of Figure 1 is conventional and various well known alternatives may be employed. For instance, cooler 3 may be a cooling coil 13 immersed in a bath of liquid sulphur dioxide as shown, or it may be any form of cooler including a cooler preceded by a heat exchanger. The contactor 5 may be advantageously a centrifugal pump as shown, although a vessel containing paddles, or a conduit containing orifices or other obstructions, may be used. Likewise settler 9 may be of any form and may contain baffles to assist in the separation of phases. Also, contactor 5 and settler 9 may be replaced by a tower containing plates or packing material through which the oil and liquid sulphur dioxide flow countercurrently to each other.

Regardless of the particular type of equipment used for carrying out the extraction process, it is general practice to cool the oil to the desired temperature before contact with the liquid sulphur dioxide, and for this purpose some form of cooler must be used. Particularly at temperatures approaching 0° F., there is a tendency to form solid incrustations in the cooler causing reduced heat transfer, increased back pressure, or even complete stoppage of the tubes of the cooler. To alleviate these difficulties in the example given in Figure 1, and in accordance with the invention, a portion of the extract phase discharged by pump 11 into line 12 is withdrawn through line 14, by proper regulation of valves 15 and 16, and mixed with the untreated oil in line 2. The volume of extract phase so withdrawn through line 14, and so mixed, may advantageously be about 25% of the volume of the oil charged to the process by pump 1, although the volume may vary between about 10% and about 50% of the volume of the oil charged. From the foregoing it is apparent that the amount of this recirculated extract should not be greatly in excess of the amount necessary to restrict the formation of the solid incrustations. If more extract phase is used cooler 3 will be required to handle greater quantities of liquid with resulting loss in efficiency and increased back pressure. In any event it is undesirable to add extract phase in excess of that which will go into solution in the oil charged.

In Figure 2 is illustrated a form of the invention applied to a three stage countercurrent treating process. Oil is charged by pump 21 through line 22, heat exchanger 23, and line 24 into coil 25 of cooler 26, in which the temperature is reduced to the desired amount (between about 0° F. and about 35° F. depending on the stocks treated). Cooler 26 may advantageously comprise a coil 25 immersed in a bath of liquid sulphur dioxide which is maintained at the desired temperature by evaporation of $SO_2$ gas which is removed through line 27 to compressors (not shown). The cooled oil then passes into contactor 28 wherein it is mixed with extract phase obtained from settler 33 through line 35. The mixture then passes into settler 29 wherein the resulting phases separate and the extract phase is withdrawn through line 31 and charged to evaporators (not shown) by pump 40 through line 46 and valve 47. The oil phase in settler 29 leaves through line 30 and enters contactor 32 wherein it is mixed with extract phase obtained from settler 37 through line 39. This mixture then passes to settler 33 where the extract phase settles and leaves through line 35. The oil layer in settler 33 leaves through line 34, enters contactor 36 wherein it is mixed with cold liquid sulphur dioxide supplied from storage tank 41, through line 42, and regulated by valve 43. The volume of liquid sulphur dioxide supplied to contactor 36 is generally between 100% and 300% of the volume of oil charged by pump 21, although other proportions may in some instances be used. The mixture of oil and liquid sulphur dioxide from contactor 36 passes into settler 37 from which the extract phase is removed through line 39. The raffinate phase from settler 37 passes out through line 38, heat exchanger 23, and line 44. Suitable back pressure is maintained on the system by valves 45 and 47.

The process of Figure 2 up to this point is a conventional countercurrent system in which the most extracted oil meets the fresh solvent and the raw oil is extracted with the most exhausted solvent all according to well known principles of countercurrent extraction. The various apparatus shown, having no part in the invention, may be replaced by other apparatus having similar functions. For example the three stages of contactors and settlers may be replaced by contact towers through which the oil and liquid sulphur dioxide phases pass countercurrently to each other. The number of stages may be increased or decreased as desired.

According to the present invention, the formation of solid incrustations in coil 25 is prevented by withdrawing a portion of the extract phase in line 46, through line 49, and valves 48 and 50, and mixing this withdrawn portion with the oil in line 24. As in the case of single stage treatment described with reference to Figure 1, the volume of extract phase so injected into the oil in line 24 should be from about 10% to about 50% of the volume of the oil charged to the process by pump 21, the preferred amount being about 25%.

If desired, the extract phase from line 46 may be injected into the raw oil before it enters the heat exchanger 23. In such case valve 50 is closed and the extract phase is passed through valve 51 and line 52 to enter the oil in line 22.

Instead of extract phase from settler 29, extract phase from settler 33 may be used for the purposes of the invention. This may be obtained by closing valve 48 and withdrawing extract phase from line 35 through valve 53 and line 55. It is to be noted that, in such case, an additional pump 54 is required to overcome the pressure drop in the apparatus. Since lines 31 and 46 are already supplied with pump 40 the use of extract from settler 29 is to be preferred as presenting less difficulties of control.

Likewise, extract phase from settler 37, or even fresh liquid sulphur dioxide may be pumped into the oil in line 22 or line 24 to accomplish the purposes of the invention. However, the use of these materials will necessarily disturb the advantages obtained by the countercurrent treatment.

While the invention has been described above in relation to the solvent refining of oils with liquid sulphur dioxide, the invention is applicable to various mixtures of liquid sulphur dioxide and other solvents, such for example as mixtures of benzol and sulphur dioxide. In the appended claims the term "liquid sulphur dioxide" and "liquid $SO_2$" are intended to include mixtures of liquid sulphur dioxide and other solvents which are added to the sulphur dioxide to vary the solubility and solvency characteristics of the liquid sulphur dioxide.

Likewise the invention is applicable to selective solvents other than liquid $SO_2$. Various solvents are known to the art as suitable for selectively dissolving and separating the more aromatic constituents from hydrocarbon oils. Several such solvents are now in commercial use, while others are in the stages of development. Such solvents may be used in either single stage or multiple stage treatments similar to that described above for liquid $SO_2$.

When oils are treated with any selective solvent at temperatures below the freezing point of water, particularly at temperatures below about 15° F., the formation of frozen solids (due to water in the oil) in the precooling equipment can be overcome by adding extract phase to the oil before it enters the cooler, providing, of course, that the particular solvent has an affinity for water.

In the appended claims the term "selective solvent" is used to denote a solvent suitable for selectively dissolving and separating the more aromatic constituents from hydrocarbon oils, and such selective solvent is not limited to the liquid sulphur dioxide specifically used for illustration herein as a very commonly used solvent, but includes other selective solvents such as benzonitrile, Cellosolve acetate, pyridine, nitrobenzene, cresylic acid, aniline, benzaldehyde, butyl carbitol, isobutyl alcohol, and the like.

A common attribute of a number of such selective solvents is their affinity for water, or absorptive power for water, to a greater or less degree.

To this end, the invention is broadly applicable to the dehydration of oils by the use of such selective solvents but specifically applicable to oil refinery processes in which the selective solvent exercises the dual function of dehydrating while dissolving certain hydrocarbons.

Thus, while the use of a selective solvent, such as liquid sulphur dioxide, is primarily applied to straight run oils or distillates in ordinary refinery practice, the invention is not limited to the treatment of such straight run oils but includes the treatment of any oil, cracked or otherwise, in which a selective solvent is used and in which water removal particularly at low temperatures is a factor.

I claim:

1. A process for treating hydrocarbon oils which comprises: continuously flowing a hydrocarbon oil containing water and of a viscosity lower than lubricating oil through a cooler, flowing the cooled oil countercurrently to liquid $SO_2$ through a series of treating zones in each of which there is formed an extract phase comprising constituents of the hydrocarbon oil dissolved in liquid $SO_2$, contacting the hydrocarbon oil in each zone with the extract phase derived from the next succeeding zone in the direction of oil flow, contacting the hydrocarbon oil in the last zone with liquid $SO_2$, and preventing the formation of solid particles in said cooler by introducing into the stream of oil prior to its passage into said cooler a quantity of extract phase derived from at least one of said treating zones insufficient to cause substantial separation of said extract and oil in said cooler.

2. The process according to claim 1 in which the quantity of extract phase introduced into the stream of oil prior to the cooler is from about 10% to about 50% of the volume of the hydrocarbon oil.

3. The process according to claim 1 in which the quantity of extract phase introduced into the stream of oil prior to the cooler is about 25% of the volume of the hydrocarbon oil.

4. A process for treating hydrocarbon oils which comprises: continuously flowing a hydrocarbon oil containing water and of a viscosity lower than lubricating oil through a cooler, flowing the cooled oil countercurrently to liquid $SO_2$ through a series of treating zones in each of which there is formed an extract phase comprising constituents of the hydrocarbon oil dissolved in liquid $SO_2$ contacting the hydrocarbon oil in each zone with the extract phase derived from the next succeeding zone in the direction of oil flow, contacting the hydrocarbon oil in the last zone with liquid $SO_2$, and preventing the formation of solid particles in said cooler by introducing into the stream of oil prior to its passage into said cooler a quantity of extract phase derived from the first of said treating zones in the direction of oil flow insufficient to cause substantial separation of said extract and oil in said cooler.

5. The process according to claim 4 in which the quantity of extract phase introduced into the stream of oil prior to the cooler is from about 10% to about 50% of the volume of the hydrocarbon oil.

6. The process according to claim 4 in which the quantity of extract phase introduced into the stream of oil prior to the cooler is about 25% of the volume of the hydrocarbon oil.

7. A process for treating hydrocarbon oils which comprises: continuously flowing a hydrocarbon oil containing water and of a viscosity lower than lubricating oil through a cooler, flowing the cooled oil countercurrently to a selective solvent having affinity for water through a series of treating zones in each of which there is formed an extract phase comprising constituents of the hydrocarbon oil dissolved in the selective solvent, contacting the hydrocarbon oil in each zone with the extract phase derived from the next succeeding zone in the direction of oil flow, contacting the hydrocarbon oil in the last zone with fresh selective solvent, and preventing the formation of solid particles in said cooler by introducing into the stream of oil prior to its passage into said cooler a quantity of extract phase derived from at least one of said treating zones insufficient to cause substantial separation of said extract and oil in said cooler.

8. A process for treating hydrocarbon oils which comprises: continuously flowing a hydrocarbon oil containing water and of a viscosity lower than lubricating oil through a cooler, flowing the cooled oil countercurrently to a selective solvent having affinity for water through a series of treating zones in each of which there is formed an extract phase comprising constituents of the hydrocarbon oil dissolved in the selective solvent, contacting the hydrocarbon oil in each zone with the extract phase derived from the next succeeding zone in the direction of oil flow, contacting the hydrocarbon oil in the last zone with fresh selective solvent, and preventing the formation of solid particles in said cooler by introducing into the stream of oil prior to its passage into said cooler a quantity of extract phase derived from the first of said treating zones in the direction of oil flow insufficient to cause substantial separation of said extract and oil in said cooler.

9. In a process wherein a mixture of liquid hydrocarbons containing water and of a viscosity lower than lubricating oil is first cooled by flowing through a cooler and the cooled oil is then flowed countercurrently to liquid $SO_2$ through a series of treating zones in each of which there is formed an extract phase comprising constituents of the hydrocarbon oil dissolved in liquid $SO_2$, the hydrocarbon oil in each zone is contacted with the extract phase derived from the next succeeding zone in the direction of oil flow, and the hydrocarbon oil in the last zone is contacted with liquid $SO_2$, the step which comprises: preventing the formation of solid particles in said cooler by introducing into the stream of oil prior to its passage into said cooler a quantity of extract phase derived from at least one of said treating zones insufficient to cause substantial separation of said extract and oil in said cooler.

10. The process according to claim 9 in which the quantity of extract phase introduced into the stream of oil prior to the cooler is from about 10% to about 50% of the volume of the hydrocarbon oil.

11. The process according to claim 9 in which the quantity of extract phase introduced into the stream of oil prior to the cooler is about 25% of the volume of the hydrocarbon oil.

12. In a process wherein a mixture of liquid hydrocarbons containing water and of a viscosity lower than lubricating oil is first cooled by flowing through a cooler and the cooled oil is then flowed countercurrently to a selective solvent having affinity for water through a series of treating zones in each of which there is formed an extract phase comprising constituents of the hydrocarbon oil dissolved in the selective solvent, the hydrocarbon oil in each zone is contacted with the extract phase derived from the next succeeding zone in the direction of oil flow, and the hydrocarbon oil in the last zone is contacted with fresh selective solvent, the step which comprises: preventing the formation of solid particles in said cooler by introducing into the stream of oil prior to its passage into said cooler a quantity of extract phase derived from at least one of said treating zones insufficient to cause substantial separation of said extract and oil in said cooler.

OSCAR LARSON.